Patented Nov. 5, 1940

2,220,412

UNITED STATES PATENT OFFICE 2,220,412

REFRACTORY AND METHOD OF MAKING SAME

Charles J. Kinzie and Eugene Wainer, Niagara Falls, N. Y., assignors to The Titanium Alloy Manufacturing Company, New York, N. Y., a corporation of Maine No Drawing. Original application February 17, 1939, Serial No. 256,928. Divided and this application April 13, 1940, Serial No. 329,524

7 Claims. (Cl. 106—9)

This application is a division from our copending application Serial No. 256,928, filed February 17, 1939.

Our invention relates to bonded refractories and especially to new methods of bonding refractories and new refractory compositions.

The special refractories field is characterized not only by a group of special and usually expensive materials, but also by the mode of fabrication and manufacture indigenous to the particular refractory, none of which is normally applicable to the manufacture of other refractories. This special refractories field has developed because of certain unusual demands on refractories not satisfactorily fulfilled by refractories already in existence. For example, some applications demand extremely high softening points; others, extreme resistance to thermal shock and to spalling; others, a minimal dimensional change through a wide range of temperatures; others, the possibility of direct fabrication to accurate and controlled sizes; others, certain special electrical properties; others, high heat conductivity; others, low heat conductivity; others, low specific gravity; others, high hot strength; others, high hot strength and low cold strength or vice versa, etc. plus any combination of the above properties besides a large number of special properties too numerous to mention. Among such applications are for use in the dental industry, for heavy duty at high temperatures, for insulation at high temperatures, and for fabrication by slip casting or mold casting.

We have discovered novel and improved methods, compositions and bonding agents, which more or less completely fulfill the exacting demands for refractories, particularly in the dental industry. Furthermore, by the use of these novel bonding agents and methods we have found it possible adequately to bond practically any superrefractory material which can be obtained in suitable grain sizes, or any desired combination of these refractory materials, with the exception of the highly basic magnesite or fused magnesia bodies. These improved methods are applicable not only to superrefractory materials, but also to normal refractories, with the exception of magnesite and dolomite, that are capable of being obtained in suitable grain sizes, and to combinations of these normal refractories with each other, or with the superrefractories. By the use of these novel bonding agents and methods we have found it possible economically to prepare in a strong form the highly porous light-weight type of refractory known as insulating firebrick.

These novel bonding agents comprise the double silicates of zirconium and either zinc or aluminum, and the zirconates of zinc or aluminum, either singly or in desired combination.

The double silicates may be prepared in a variety of ways. For example, they may be prepared by thermally reacting finely divided zirconium silicate with the oxide or carbonate of the named element; or by thermally reacting zirconium oxide and silica with the oxide or carbonate of the named element; or by thermally reacting zirconium oxide with the silicate of the named element. A suitable setting agent involving aluminous material is a fired intimate mixture of clay and zirconium oxide, mixed mol for mol, milled after firing at 2100° F. for three hours, in which form it is suitable for use. The zirconates may be prepared by thermal reaction of zirconium oxide with the oxide or carbonate of the named element.

These bonding agents may be used alone, but preferably in combination with suitable amounts of an acid chosen from the group $H_3PO_4$, HCl, $H_2SO_4$, $HNO_3$. Of these acids we prefer to use $H_3PO_4$ because of the refractoriness of its thermal products, its ease in use, and also its relatively low corrosive activity in comparison with the other acids. A $H_3PO_4$ content up to 10% may be used, but we prefer to use between 3% and 7%, since the lower the satisfactory $H_3PO_4$ content, the less is the danger of disintegration at high temperatures.

In regard to the quantity of bonding agent, we have found that percentages higher than 5% of $ZnZrSiO_5$, when used with zircon refractories, cause cracking on setting. Since this material presents desirable properties from the standpoint of high green strength, it is desirable to use it. We have also found that a mixture of zinc zirconium silicate with calcium zirconium silicate produces to a large extent the high green strengths attainable with the use of the former, without the cracking sometimes encountered with its use.

Any of the standard organic binders may be used to produce green strength; however, we have found that a 5% gelatine solution is the best for general usage, particularly with zircon ware.

By using these refractory materials in combination with the heretofore described bonding agents, a casting refractory for practically every known application may be advantageously made, with controlled working and setting times and also with practically any desired set of properties. For example we have obtained for the dental industry, by continually varying a suitable mixture of zircon and quartz sands from pure zircon to pure quartz, permanent changes in dimensions varying all the way from 6.5% shrinkage to 3.5% expansion with any desired thermal expansion in the temperature range from 1200° F. to 3000° F. normally required in dental refractories.

We have also found that the refractory combinations may be still further modified for special applications and for special properties by the addition of materials not properly considered refractory. For example, the addition of a small amount of fluorspar produces high setting expansion and also contributes to a low temperature vitreous bond. Sodium-silico-fluoride promotes high setting shrinkage and also contributes to low temperature vitreous bond. Lead compounds produce very low temperature vitreous bonds and produce bodies having valuable electric insulating properties. Barium compounds add valuable electric resistivity and insulation properties. Various colored oxides may be added to produce desired body colors. Boron and magnesium compounds also contribute to the maintenance of high temperature electrical resistivity.

The use of silicon carbide as a base enables us to produce an extremely highly refractory body with a high heat and electrical conductivity and a good resistance to thermal shock. It can be used in reducing atmospheres. Combinations of silicon carbide and zircon in cement form are also suitable as refractory coat for electrical heating elements.

Refractory ware comprising a mixture of zircon and silicon carbide containing the bonding agents of the present invention develops very high green and preliminary fire strength, and shows moduli of rupture between 1500 and 3000 pounds per square inch in the finished fired piece. Such ware also permits firing at much higher temperatures than 2800° F. without dissipation of strength characteristics of the bond. Finally, by use of these bonding agents in conjunction with $H_3PO_4$, ware of SiC plus zircon can be cast, pressed, sprayed or extruded, or dipped with the advantageous green strength developed at temperatures between 30° and 50° C. Still further to decrease the weight of this high conductivity zircon-silicon carbide ware, we may replace part of the refractory grain mix with coke which, on firing, burns out so as to produce light weight finished ware. Reductions in weight of over 50% may be obtained and still result in worthwhile ware. To reduce weight, it is advisable to add not more than 20% by weight of coke.

Fused alumina base bodies produce steady and even thermal expansion from room temperature to 1500° C. totaling 1.2 percent. Spinel, sillimanite or kyanite bodies bonded by our improved methods have excellent electrical resistance at high temperatures. High kyanite additions produce rapid volume increases above 1100° C. Andalusite increases in volume above 1400° C. Natural baddeleyite shows rapid expansion at 2900° F. Forsterite, sillimanite and mullite produce high temperature bodies with extreme resistance to spalling as well as high hot load strengths, etc.

The possible combinations of desirable properties which can be obtained with our bonding agents and procedures may be expanded to cover practically every refractory application known in the casting field.

A description of the manner in which we practice our invention is as follows: The refractory grain suitable for the desired purpose are first prepared in a physical state so that the aggregate is amenable to good casting procedure. For example, a mixture of equal parts by weight of minus 35 mesh grain size and minus 200 mesh grain size normally will afford a smoothly flowing mix when incorporated in water. A refractory aggregate consisting entirely of minus 200 mesh material also produces good working properties resulting in a still finer grained product. Aggregates consisting wholly or in part of more than 35 mesh coarseness usually cause a granular mixture which interferes with good application. To the properly sized refractory aggregate or mixture of various refractory aggregates is added about 6% by weight of phosphoric acid of specific gravity 1.71; while 6% is satisfactory for most purposes, the phosphoric acid may be reduced as low as 2% or increased as high as 9% for particular applications. The acid and refractory grains are completely mixed and then passed through a 10 to 20 mesh screen to insure complete distribution of the acid throughout the refractory.

To 100 parts by weight of this damp mixture is added between 3 and 10 parts by weight of the bonding agents or proper mixtures of these bonding agents. While normally less than 3 parts of the bonding agent does not produce proper casting cold strength, more than 10 parts may be used if necessary or desired for particular applications. The bonding agent is thoroughly mixed with the acid-refractory aggregate. To this mixture is then added sufficient water to produce an easily workable mixture. For a high density material consisting of zircon, the amount of water necessary will vary between 8 and 12 cc. per 100 grams of the mix. For a relatively low density material, such as quartz, clay, silicon carbide, etc., the amount of water necessary will vary between 10 and 15 cc. per 100 grams of the mix. Tap water may usually be used directly as the water addition. However, we have found that time of set is normal when water has a high pH=7.5–8.5, due to dissolved lime compounds, and that the time of set is appreciably increased when the tap water is neutral or on the acid side. The pH of neutral or acid waters may be suitably built up by proper treatment with lime.

The refractory-acid aggregate, bonding agent and water are thoroughly mixed until a smooth free-flowing slip is obtained and the fluid is then cast into place. The casting is allowed to stand quietly until sufficiently hard for easy handling, the mold demounted and the piece dried and fired.

The speed and extent of the drying and firing operations depend on the size of the piece, the strength of the bond, the chemical and physical nature of the base refractory, and to some extent the final application of the piece. For example, a refractory clay should be dried and fired slowly due to the shrinkage on drying and also changes in crystal modification on the increases in temperature. A zircon casting may be dried and fired with extreme rapidity because it does not suffer from such defects. A mullite body is normally fired to 2400° to 2600° F. if its final application is high temperature service. A zircon body need be fired only to 1800° F. where its final application is resistance to low temperature fused phosphate corrosion, etc. To secure satisfactory hardness and strength in zircon ware containing $H_3PO_4$, it should be fired to 1600°–1800° F., while such ware which does not contain $H_3PO_4$ should be fired to at least 2400° F. to reach a satisfactory strength. The great advantage in the $H_3PO_4$ addition is that low temperature bonding is commercially inexpensive.

Use of zinc zirconium silicate produces a set in 30 minutes to an hour, and the casting can be handled in 1½ hours. The speed of setting may be still further increased by the addition of alkali metal zirconium silicates, normally in the proportion of about 1 part of the latter for every 2 to 3 parts of zinc zirconium silicate, to produce the satisfactory set additions.

In general the thermal reaction products of zirconia and the oxides mentioned in respect to the bonding agents (forming zirconates) will produce a faster and harder set than an equal amount of the corresponding zirconia, silica, and the oxide compound (forming double zirconium silicates). Here again mixtures of zirconates and the double silicates as bonding agents show definite advantages.

To form the lightweight, porous insulating refractories, the casting cement is prepared just as we have heretofore described except that just before casting a definite volume of granular organic material, such as cork, coke or wood, is added and well mixed in. The mixture is then cast, dried and fired; on firing the organic materials burn out leaving voids so as to produce a cellular refractory body of excellent utility for thermal and sound insulation and also of very low specific gravity.

When adding acids, increasing the acid concentration increases the time of set. We have found that small quantities of acids other than phosphoric acid are more efficient in this regard. Such acids include the solid organic acids such as oxalic, tartaric, citric, etc. and the inorganic and organic strongly acid salts. Such inorganic and organic acid salts are sodium or potassium acid sulphate, sodium or potassium acid phosphates, ammonium acid sulphate or ammonium acid phosphate, the acid fluorides of sodium, potassium or ammonia. The organic acid salts are the acid salts of sodium, potassium or ammonium with oxalic, tartaric, citric acids, etc., for example, sodium acid oxalate, etc. To a lesser extent boric acid may be used. From an industrial handling point of view, these acids may also be considered more efficacious than heavy concentrations of liquid phosphoric acid, due to the difficulties involved in handling sludges highly concentrated in a liquid corrosive acid. Furthermore, the organic acids are eliminated easily in the firing cycle, and cannot complicate the possible utility of the finished body since no fired residue remains.

While we have heretofore dealt chiefly with casting procedures, we do not limit ourselves to this type of application alone. Simply by reducing the amount of added water the cements may be applied by ramming or pressing.

To illustrate more in detail the methods of practicing our invention we will set forth several examples.

*Example 1*

50 parts of —35 mesh granular quartz, 44 parts of —200 mesh milled quartz, and 6 parts of $H_3PO_4$ (sp. gr. 1.71) are thoroughly mixed. 10 parts of a bonding agent, which may be any of the following:

a. The thermal reaction product of ZnO or $Al_2O_3$ with $ZrO_2$ and $SiO_2$;
b. The thermal reaction product of $ZrO_2$ and either ZnO or $Al_2O_3$;
c. A 2 to 1 mixture of (a) or (b) and a thermal reaction product of $Li_2O$, $Na_2O$ or $K_2O$ with $ZrO_2$ and $SiO_2$;

are added and mixed therewith. Water is then added and mixed, and the product cast. It is then dried and fired on schedule to 1800° F. if a porous non-vitreous body is desired, as in the dental casting industry. A tighter more vitreous body with better high temperature properties is obtained by schedule firing to 2400° F.

In the above example, other refractory materials, aggregate and milled, may be substituted for quartz, granular and milled. Such materials are aluminum oxide, silicon carbide, rutile, fused zirconium dioxide, mullite, sillimanite, olivine, forsterite, chromite, refractory clay, kaolin, beryl, spinel, kyanite, thorium oxide, thorite, ceria, feldspar andalusite, talc, baddeleyite, porcelain, raw or synthetic, calcined or uncalcined, alone as stated or mixed with each other or zircon. Where the body contains more than 50% talc, feldspar or porcelain, the upper firing limit need not exceed 2200° F.

*Example 2*

The same procedure is followed as in Example 1, except that 5 parts instead of 10 parts of bonding agent are used. 8 to 12 parts of water may be used.

*Example 3*

The same procedure is followed as in Example 1, with the following ingredients:

| | Parts |
|---|---|
| Milled refractory —200 mesh | 94 |
| $H_3PO_4$ (sp. gr. 1.71) | 6 |
| Bonding agent | 5 to 10 |
| Oxalic acid | 1 |
| Water | 12 to 20 |

The oxalic acid may be omitted if desired. If used, it is initially mixed with the refractory and $H_3PO_4$. Much finer grained castings will result than in the previous examples.

*Example 4*

The following charge is made by intimately mixing parts by weight:

| | Parts |
|---|---|
| 60 mesh zircon sand | 50 |
| —200 mesh milled zircon | 45 |
| Milled zinc zirconium silicate, or a mixture of $ZnZrSiO_5$ with $CaZrSiO_5$, $BaZrSiO_5$, $MgZrSiO_5$, or $SrZrSiO_5$ | 5 |
| Phosphoric acid | 5 |
| Water | 6 |

The thick slurry is then poured into suitable molds and entrapped air is removed by usual vibratory methods. At room temperature, the final set is obtained in about one hour, and the mold may then be stripped. The shape is then dried and fired to about 1000° C. in accordance with approved refractory procedures. The final ware does not soften at 3000° F.

The above mix is made suitable for dipping, brushing or spraying by the addition of 2 or more parts of water. Any increase of the amount of setting agent increases the green strength after the set, decreases time of set and hardness of finished ware. As low as 2 parts of the setting agent can be used where prolonged time of set, relatively low green strength, etc., attendant on use of smaller amounts of setting agent, are not important for the finished article. No more than 5 parts of $ZnZrSiO_5$ should be used, since larger quantities cause splitting of thick sections on setting.

Example 5

The mix comprises the following:

| | Parts |
|---|---|
| 60 mesh zircon sand | 50 |
| −200 mesh milled zircon | 45 |
| Fired equimolecular mixture of clay and zirconium dioxide (or 5 parts zirconium spinel) | 5 |
| Phosphoric acid | 5 |
| Water | 6 |

This mix is treated in the same manner as in Example 4; the time of set is 1 hour, and the finished article is stable at 3000° F. The addition of 2 or more parts of water makes the mix amenable to dipping, spraying or brushing.

Although 5 parts of setting agent are specified, up to 20 parts can be used. Any increase in the amount of the setting agent decreases the time of set with no marked decrease in refractory properties.

Example 6

The mix comprises the following:

| | Parts |
|---|---|
| 60 mesh zircon | 50 |
| −200 mesh milled zircon | 45 |
| Calcium zirconium silicate | 7 |
| Zinc zirconium silicate | 3 |
| Phosphoric acid | 5 |
| Water | 7 |

The mix is treated in the same manner as in Example 4; the time of set is 30 minutes and the finished article is stable at 3000° F. The addition of 2 or more parts of water makes the mix amenable to dipping, spraying or brushing.

In Examples 4, 5 and 6, the mix may be used as a ramming mixture by adding about 40% of the water specified for a casting mix so as to form a mealy, partially dry mixture. The zirconium silicate as well as the double zirconium silicates referred to in these examples are definitely based on pure zirconium silicate of the following composition:

| | Per cent |
|---|---|
| Zirconium silicate ($ZrSiO_4$) | 97 to 100 |
| $TiO_2$ | 0 to 0.20 |
| $Fe_2O_3$ | 0 to 0.05 |
| $Na_2O$ | 0 to 0.04 |
| Rare earths, Ce, La, etc. | 0 to 0.20 |
| Free quartz | 0.10 to 2.00 |

The zircon composition which we prefer to use in this process and for use in making the double silicates specified therein has approximately the following composition:

| | Per cent |
|---|---|
| $ZrSiO_4$ | 99.70 |
| $TiO_2$ | 0.030 |
| $Fe_2O_3$ | 0.010 |
| $Na_2O$ | 0.003 |
| $Al_2O_3$ | 0.020 |
| $CeO_2$ | 0.030 |
| $La_2O_3$ | 0.005 |
| $P_2O_5$ | 0.09 |
| $Cr_2O_3$ | 0.001 |
| $CaO$ | 0.100 |
| $MgO$ | 0.002 |
| $CuO$ | 0.001 |
| $SnO_2$ | 0.002 |
| $B_2O_3$ | 0.001 | with practically no trace of free quartz.

Example 7

The following charge is made by intimately mixing the following ingredients:

| | | |
|---|---|---|
| −35 mesh pure zircon sand | grams | 1333.3 |
| −200 mesh pure zircon sand | do | 666.7 |
| −35 mesh silicon carbide | do | 500.0 |
| Phosphoric acid of specific gravity 1.71 | cc | 73.0 |
| 5% gelatine solution plus | cc | 50.0 |
| Zinc zirconium silicate powder | grams | 50 |

The ratio of silicon carbide to zircon may be varied from the above mix to

| | Grams |
|---|---|
| −35 mesh zircon | 835 |
| −200 mesh zircon | 415 |
| −35 mesh silicon carbide | 1250 |

The gelatine solution in this latter case is increased to 150 cc.

Where a close-grained, tight, low porosity body is desired, the mix is fabricated entirely of −200 mesh zircon and −200 mesh silicon carbide. For such a mix patterned after Example 7, we increase the amount of phosphoric acid to 125 cc. and the amount of gelatine solution to 160 cc. When equal weight mixtures of zircon and silicon carbide are used in the −200 mesh state, we increase the amount of phosphoric acid to 125 cc. and the amount of gelatine solution to 190 cc.

The above ingredients are completely mixed, screened, pressed into the proper shape, which is then dried and fired in accordance with standard refractory procedures to 1800° F.

Example 8

For casting, dipping or spraying, the mix comprises:

| | | |
|---|---|---|
| −35 mesh pure zircon sand | grams | 1333.3 |
| −200 mesh pure zircon sand | do | 666.7 |
| −35 mesh silicon carbide | do | 500.00 |
| Phosphoric acid of specific gravity 1.71 | cc | 73.0 |
| 5% gelatine solution plus | cc | 125.0 |
| Zinc zirconium silicate powder | grams | 100 |

Where a closed-grained, tight, low porosity body is desired, the mix is fabricated entirely of −200 mesh zircon and −200 mesh silicon carbide. For such a mix patterned after Example 8, we increase the amount of gelatine solution to 200 cc. of phosphoric acid to 125 cc.

The above ingredients are completely mixed into a thick slurry, cast or sprayed into place, allowed to set at room temperature and are then dried and fired to 1800° F. in accordance with standard refractory procedures.

Example 9

The mix comprises the following ingredients:

| | | |
|---|---|---|
| −35 mesh zircon sand | grams | 1066.6 |
| −200 mesh zircon sand | do | 533.4 |
| −35 mesh silicon carbide | do | 400.0 |
| −10–20 mesh petroleum coke | do | 500.0 |
| Phosphoric acid of 1.71 specific gravity | cc | 85.0 |
| 5% gelatine solution plus | cc | 140.0 |
| Zinc zirconium silicate powder | grams | 50 |

All the above ingredients, except the coke, are intimately mixed, and the coke is folded in last. The ware is pressed, dried and fired in accordance with usual refractory procedures up to 1800° F. It produces a body weighing 50% less per unit volume than that derived in Example 7.

Example 10

The mix comprises the following ingredients:

| | |
|---|---|
| −35 mesh zircon sand_____grams__ | 1333.3 |
| −200 mesh zircon milled_____do___ | 666.7 |
| −35 mesh silicon carbide_____do___ | 500.0 |
| 5% gelatine solution plus_____cc__ | 125.0 |
| Zinc zirconium silicate powder___grams__ | 75 |

Where a close-grained, tight, low porosity body is desired, the mix is fabricated entirely of −200 mesh zircon and −200 mesh silicon carbide. For such a mix patterned after Example 10, we increase the amount of gelatine used to 280 cc.

When the whole charge is mixed we press same into shape, dry and fire according to standard refractory procedures up to 2400° F.

In any of Examples 7, 8 or 9 a mixture of 8 parts of calcium zirconium silicate and 2 parts of zinc zirconium silicate may be substituted for each 5 parts of zinc zirconium silicate. In Example 10 this substitution may be made for each 7.5 parts of zinc zirconium silicate.

From the standpoint of utility and in further explanation of the above examples we present the following advantages: Quartz alone as added to other bodies adds a good measure of refractoriness, increases resistance to acid fluxes, adds hot strength at high temperatures, and enables a choice of any expansion value practically desired in the dental range particularly.

Zircon alone or added to other bodies produces superrefractoriness, increases resistance to acid fluxes, produces very dense bodies of high thermal shock resistance. It affords very low thermal expansions and low heat conductivity. Zircon refractories are also highly useful in applications involving pronounced resistance to corrosion by alkali phosphate fused baths. The corrosive nature of this type of fusion is such as to rapidly disintegrate the usual refractory bricks, such as fireclay, mullite, fused quartz, fused alumina, silicon carbide, magnesite, chromite, etc. Our zircon refractories have been found to withstand the action of such melts 10 to 100 times better than any other commercially known refractory of this type.

Of other refractories, silicon carbide increases thermal resistance in reducing atmospheres, adds heat and electrical conductivity, reduces density, is superrefractory and shows excellent high temperature properties. Aluminum oxides afford steady and definite thermal expansions through a wide range of temperatures, adds poor thermal shock characteristics, adds resistance to basic fluxes and is superrefractory. The mullites, sillimanites, andalusite, kyanite, olivine, forsterite, etc. are superrefractories with excellent high temperature properties, show excellent resistance to glasses and glassy slags. Chromite is superrefractory, neutral to slags, has poor thermal shock resistance. Beryl, talc, spinel and rutile, and certain porcelains have excellent electrical properties, poor superrefractory qualities with the exception of spinel. The magnesia minerals in general show good temperature characteristics of electrical resistivity. The feldspars, clays and kaolin are well known with respect to properties and afford cheap sources of refractoriness. Thorite, thoria and ceria are superrefractories and possess good electrical properties. Zirconium dioxide is a neutral material, with a very high melting point.

By means of the above materials alone or in mixture each develops its particular set of properties to the extent that it is present, and results in a collection of compositions which permits practically every known refractory application to be covered. For example, combinations of zircon with rutile or rutile alone, with magnesia containing materials, and bonded by the barium compounds, suitably shaped and fired produce an excellent set of electrical properties. Combinations of zircon and carborundum produce a body which is at once heat-resistant and heat conducting. In other words, each material develops the properties for which it is known when used alone or in combination with others by the use of the bonds we have heretofore described. This statement is true only when the bodies are fired or used considerably below the vitrification or combination point of any particular refractory combination. Above this temperature the refractory is modified by the possible formation of eutectics. For example, mixtures of zircon and aluminum silicates soften and melt rapidly at approximately 3000° F. because of the formation of relatively low melting point eutectics.

We claim:

1. A composition suitable for forming refractory masses comprising a major proportion of a refractory material and a minor proportion of a preformed material taken from the group consisting of zinc zirconate, aluminum zirconate, zinc zirconium silicate and aluminum zirconium silicate.

2. A composition suitable for forming refractory masses comprising a major proportion of a refractory material, a minor proportion of a preformed material taken from the group consisting of zinc zirconate, aluminum zirconate, zinc zirconium silicate and aluminum zirconium silicate, and a minor proportion of an acid taken from the group consisting of $H_3PO_4$, HCl, $H_2SO_4$ and $HNO_3$.

3. A composition suitable for forming refractory masses comprising a major proportion of a refractory material, a minor proportion of preformed zinc zirconate, and a minor proportion of an acid taken from the group consisting of $H_3PO_4$, HCl, $H_2SO_4$ and $HNO_3$.

4. A composition suitable for forming refractory masses comprising a major proportion of a refractory material, an organic acid, a minor proportion of preformed zinc zirconate, and a minor proportion of phosphoric acid.

5. A composition suitable for forming refractory masses comprising a major proportion of a refractory material, a minor proportion of preformed zinc zirconium silicate, and a minor proportion of an acid taken from the group consisting of $H_3PO_4$, HCl, $H_2SO_4$ and $HNO_3$.

6. A composition suitable for forming refractory masses comprising a major proportion of a refractory material, an organic acid, a minor proportion of preformed zinc zirconium silicate, and a minor proportion of phosphoric acid.

7. The method of making refractory materials which comprises mixing a major proportion of a refractory material with a minor proportion of a preformed material taken from the group consisting of zinc zirconate, aluminum zirconate, zinc zirconium silicate, and aluminum zirconium silicate, drying the mixture, and firing at an elevated temperature.

CHARLES J. KINZIE.
EUGENE WAINER.